March 4, 1969     D. M. HESLING ET AL     3,430,968
PISTON RING ASSEMBLY
Filed Feb. 24, 1966
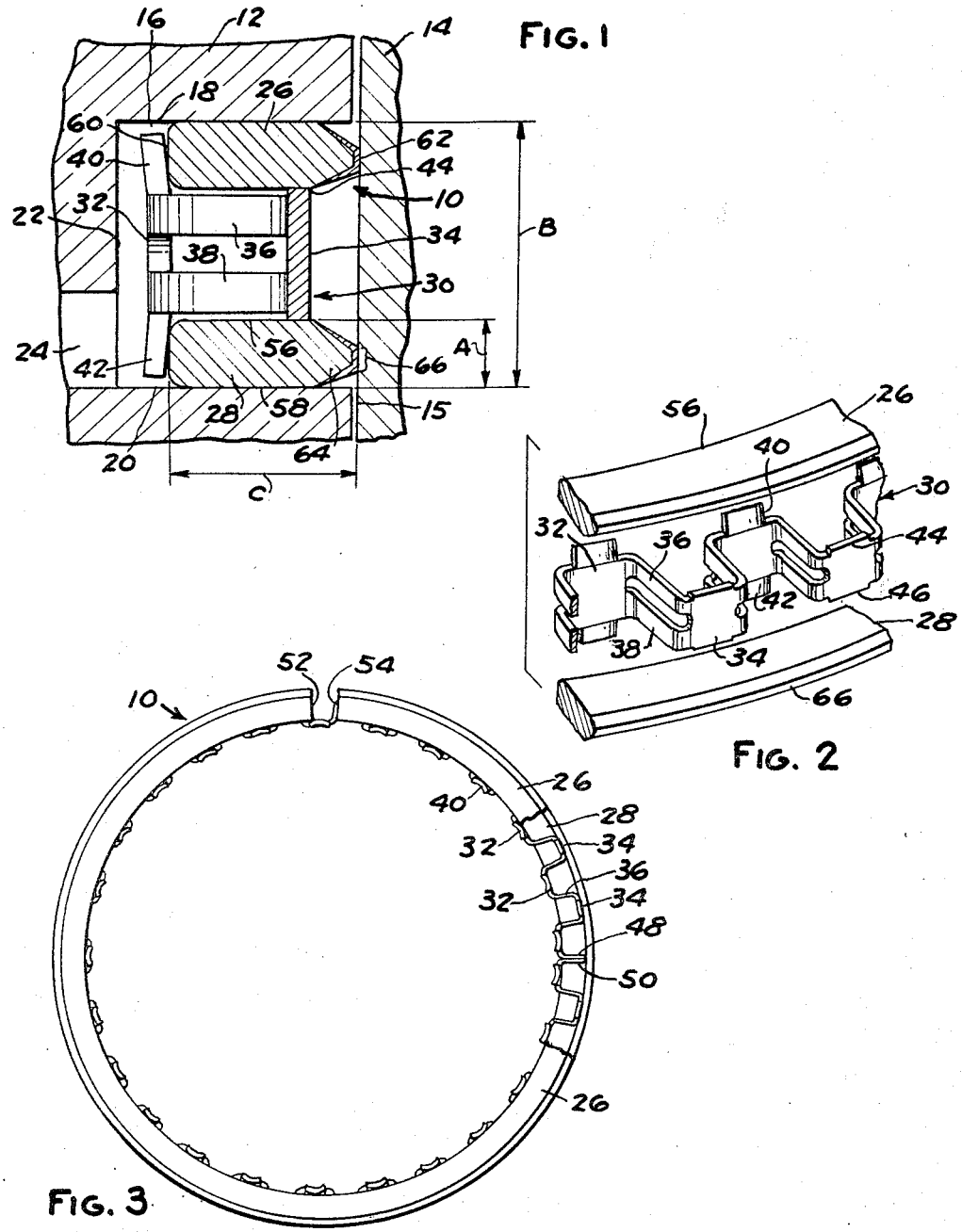
INVENTORS
DONALD M. HESLING & CALVIN N. DeBRUIN
BY
ATTORNEYS

United States Patent Office 3,430,968
Patented Mar. 4, 1969

3,430,968
PISTON RING ASSEMBLY
Donald M. Hesling and Calvin N. De Bruin, Muskegon, Mich., assignors to Sealed Power Corporation, Muskegon, Mich., a corporation of Michigan
Filed Feb. 24, 1966, Ser. No. 529,847
U.S. Cl. 277—139   9 Claims
Int. Cl. F16j 9/06, 15/00; F02f 5/00

ABSTRACT OF THE DISCLOSURE

A three-piece piston oil ring assembly comprising a non-bottoming, circumferential abutment radially corrugated expander-spacer of the type disclosed in U.S. Patent 2,789,872 and a pair of oil control rings biased by the expander-spacer radially outwardly into oil wiping engagement with the cylinder wall and axially apart into side sealing contact with the walls of the piston ring groove. The rings have an unusually large axial dimension, about double that of the prior art steel rails hitherto used with an expander-spacer of the aforementioned type in three-piece oil ring assemblies. These "overwidth" rings are effective to prevent carbon lock-up of the ring assembly even under heavy-duty operating conditions.

---

This invention relates to piston rings and more particularly to an improved oil ring assembly and rings for use therein.

It has become established practice in the automotive piston ring art to construct oil rings in the form of a "balanced" assembly of a pair of parted, flat thin oil scraping rings, termed "rails" because of their narrow axial dimension, which are spaced axially apart by an intermediate expander-spacer which is also adapted to exert radial expansion forces on the rails to force them into oil scraping contact with the cylinder wall and to spread them axially apart into side sealing contact with the top and bottom walls of the groove. Preferably a one-piece combination type expander-spacer such as that disclosed in U.S. Patent 2,789,872, is employed for this purpose since it is highly efficient and may be economically mass produced on apparatus such as that disclosed in U.S. Patent 2,925,847. This expander-spacer as well as others of open construction permit oil which is wiped from the cylinder wall and collected between the upper and lower rails to drain inwardly through the expander-spacer to piston oil drainage holes which return the oil through the skirt of the piston to the crankcase.

It has been found that when oil control ring assemblies of the above multi-piece abutment type are subjected to heavy duty operating conditions in which high oil temperatures are encountered, such as in constant high speed truck operation, there is a serious problem of oil ring clogging and lock-up due to carbon formation. The locking-up process occurs as a result of a decomposition of the oil under high temperature, causing a hard deposit to form on the side of the rail adjacent to the expander-spacer. Carbon deposits may also adhere to the expander-spacer itself, but they principally build up on the rails, following the contour of the expander-spacer and tending to embed the edge of the expander-spacer in a groove formed by ridges of carbon. Hence as such deposits build up, they increasingly restrict the spring action of the expander-spacer until finally it is completely prevented from exerting radial force against the rails. When the oil control ring assembly is thus strangled, oil control between the crankcase and combustion chamber drops off to such an extent that the oil ring is rendered practically useless long before it is actually worn out.

It is therefore an object of the present invention to provide an improved piston oil ring assembly of economical construction which is capable of overcoming the aforementioned carboning problem and thereby maintaining effectvie oil control under heavy duty operation during the life of the assembly.

Another object is to provide an improved piston ring assembly for use in the oil groove of a piston which retains the advantages of the widely accepted three-part balanced arrangement of the aforementioned Patent 2,789,872, and which also employs a proven expander-spacer of the type shown in said patent, but which incorporates an improved form of oil scraping ring in place of the conventional axially thin rail to thereby impart better wear characteristics and longer life to the oil ring assembly while also overcoming the aforementioned clogging and lock-up problems and thereby preventing the ring assembly from sticking in the groove even under adverse conditions when running in a heavy duty engine.

Other objects, features and advantages of the present invention will become apparent from the following detailed description taken in conjunction with the accompanying drawing wherein:

FIG. 1 is an enlarged fragmentary axial section through a portion of a conventional piston and associated cylinder illustrating an oil ring assembly of the present invention installed in the lower oil groove of the piston.

FIG. 2 is a fragmentary exploded perspective view of the oil ring assembly shown separately from the piston.

FIG. 3 is a plan view of the oil ring assembly with a portion of the upper scraping ring broken away to illustrate the expander-spacer in its operative, end-abutted condition.

Referring in more detail to the accompanying drawing, FIG. 1 illustrates a piston oil ring assembly 10 constructed in accordance with the present invention installed in the lower oil groove of a piston 12 reciprocable in a cylinder 14 of an internal combustion engine. Groove 16 has radially extending top and bottom walls 18 and 20 respectively and an axially extending back wall 22. A series of circumferentially spaced oil drainage passages 24 extend inwardly from wall 22 to the hollow interior of piston 12.

Referring to FIGS. 2 and 3, as well as FIG. 1, oil ring assembly 10 includes upper and lower oil scraping rings 26 and 28 positioned respectively adjacent walls 18 and 20 by an expander-spacer 30 disposed in part between and in part behind rings 26 and 28. Expander-spacer 30 preferably is of the type disclosed in the aforementioned Olson Patent 2,789,872 and Burns et al. Patent 2,925,847, and comprises a one-piece, radially corrugated spring member generally circular in outline which may be readily punched from flat ribbon stock of spring material, such as stainless steel, and curved into a split ring. Expander-spacer 30 has a series of circumferentially alternating inner and outer crowns 32 and 34 respectively integrally connected by axially spaced pairs of spring legs 36 and 38. Rearwardly or inwardly inclined lips 40 and 42 extend from the top and bottom edges respectively of the inner crowns 32 and bear respectively against the inner peripheries of rings 26 and 28. Shorter axial projections 44 and 46 extend axially from the top and bottom edges of the outer crowns 34 to form spacing seats for rings 26 and 28. Expander-spacer 30 also has radially extending ends 48 and 50 at its parting (FIG. 3) which are adapted to abut together when the expander is compressed to its operating position behind rings 26 and 28. The inside diameter of expander-spacer 30 in this condition is larger than the root diameter of groove 16 so that the expander is non-bottoming, i.e, it is capable of developing the radial and axial biasing forces on the ring members without receiving support from the bottom of the groove, and hence the expander is free to develop an equal load outwardly around its entire periphery to insure conformity of the scraping edges of rings 26 and 28 with the changing contour of cylinder wall 15 normally encountered in engine operation. Rings 26 and 28, on the other hand, are designed so that a gap exists between the parted ends 52 and 54 thereof (FIG. 3) which will vary in width but remain open when the rings are in operation and compressed to bore diameter to thereby permit radial expansion and contraction of the rings.

In accordance with a principal feature of the present invention, rings 26 and 28 depart from prior practice in that they have an "oversize" axial thickness; i.e., the dimension denoted A in FIG. 1 and taken parallel to the axis of the ring assembly between the opposite parallel top and bottom sides 56 and 58 of ring 28 is larger relative to the axial width dimension of 10, denoted B in FIG. 1, than that customarily found in the conventional flat thin steel rails normally associated with the expander-spacer of such three-piece non-bottoming oil ring assemblies. In other words, rings 26 and 28 are unusual in that they hitherto would have been considered to be "overwidth" rails inasmuch as their axial width A is preferably in the order of double that of the prior art steel rails.

However, the radial thickness of rings 26 and 28, which is denoted C in FIG. 1 and represents the distance measured radially of the ring between its inner and outer peripheries 60 and 62 respectively, is generally the same as the corresponding dimension of the prior art rails, i.e., less than about .180 inch. Due to the overwidth nature of rings 26 and 28, expander-spacer 30 must be designed with a narrower axial dimension for those portions of its structure disposed axially between rings 26 and 28 such that there is no increase in the overall axial dimension B of ring assembly 10 so that it will fit the standard sizes of oil ring grooves in automotive pistons, the more common sizes being 3/16, 1/4 and 5/16 inches nominal.

By way of one preferred example of a ring assembly of the present invention, improved results have been obtained by constructing rings 26 and 28 in expander 30 as described above and employing the following dimensional relationships and material:

Axial dimension of groove 16 __ 1/4 inch nominal.
Dimension B _____ .246 inch.
Rings 26 and 28:
    Dimension A _____ .0545 inch.
    Dimension C _____ About .155–.180 inch.
    Outside diameter _____ Ranging from about 3.875 to 5.125 inches.
    Free gap _____ .220–.340 inch.
    Material _____ Cast iron.

Preferably rings 26 and 28 have a cross sectional contour as best seen in FIG. 1 wherein the outer periphery of each ring is beveled at the corners at an angle of approximately 35° to the horizontal or radial plane of the ring to provide a "bullet-shaped" nose 64 on each ring. The nose is then chrome plated to a depth of approximately .004–.006 inch and lapped back to provide a cylinder wall contacting surface 66 parallel to the axis of the ring of relatively narrow dimension, in the order of from .008–.016 inch, to thereby provide a high unit pressure contact of the ring against cylinder wall 15, surface 66 thus having an axial width dimension approximately the same as the wall contacting surface of the conventional thin steel rails of the prior art. It is to be understood that nose 64 may be unplated, grooved and backfilled with molybdenum or coated with some material other than chromium while maintaining a reduced axial width contact surface 66.

While the improved results obtained by the present invention appear to be primarily a function of the increase in the axial dimension of rings 26 and 28, the theoretical basis for these improved results is not fully understood. Thin steel rails of the prior art oil rings range from a minimum axial dimension of .018 inch to a maximum dimension of .030 inch with the most popular size being .024 inch, as compared to the .0545 inch A dimension of the example specified above. It is believed that the increased mass of rings 26 and 28 produces appreciably increased movement of rings 26 and 28 relative to expander-spacer 30 and to side walls 18 and 20 of the oil ring groove in response to piston reciprocation, and that this increased movement of the rings tends to shear and rub off the carbon deposits as they form on the ring surfaces 56 and 58 before they have a chance to build up to the point where the aforementioned clogging and lock-up problems result. The increased axial dimension of the rings also is believed to affect the operating temperature of the rings in a manner which prevents carbon buildup due to the rings providing a better heat transfer path from the side walls of the groove to the cylinder wall. Regardless of the theoretical basis for the improved results obtained with an oil ring of the present invention, it has been found by comparison tests that where there was high wear and short life with the prior art thin rail oil ring assemblies, the oil ring assembly of the invention showed much less wear and much longer life while performing at least as well in controlling oil pumping, the prime function of any oil ring assembly. Although the aforementioned example in which rings 26 and 28 are made of cast iron has enjoyed considerable commercial success, further testing indicates that rings 26 and 28 may be made of high carbon steel while still following the "overwidth" characteristic feature of the present invention with equal or even better results.

The expansion forces for the rings 26 and 28 are preferably developed primarily by the expander-spacer 30 rather than by the designing inherent self-tensioning forces into rings 26 and 28, the free outside diameter of the rings preferably being very close to bore diameter in most instances. Also rings 26 and 28 are preferably made as solid, imperforate members as illustrated herein, with substantially all oil drainage occurring via the space between rings 26 and 28 and through the ventilation openings of the expander-spacer.

With respect to the presently preferred minimum and maximum limits of dimension A of rings 26 and 28, for a 3/16 inch axial width oil groove, which is the present minimum size oil groove to which the oil ring 10 of the present invention may be applied, preferably the minimum dimension A for cast iron rings 26 and 28 is about .048 inch. The minimum limit of dimension A depends to some extent upon the particular material from which rings 26 and 28 are made. Thus when the rings are made of cast iron it has been found that it is not practical to grind the rings to an axial width A less than about .040–.045 inch. The reason for this is that when rings 26 and 28 are made of cast iron they are finished to size by grinding surfaces 56 and 58 to parallelism and to the specified A dimension, and it has been found that it is not economically feasible in production to grind the cast iron rings to less than the aforementioned minimum dimensions. However, when rings 26 and 28 are constructed of other ferrous materials, such as high carbon steel or stainless steel, alternative production techniques and processes such as rolling become feasible and somewhat more latitude may therefore be permitted in establishing the minimum limit of dimension A. Nevertheless it has thus far been found that best results are obtained by making the minimum limit of dimension A in the order of .054 inch for oil ring assemblies adapted to fit a .250 inch nominal groove size, which is about 22% of the overall axial width of ring assembly 10 for this size groove, and about .048 inch for a .1875 inch nominal groove size, which represents about 25% of the total axial width of ring assembly 10 for this smaller size groove. With the above considerations in mind, the minimum limit of dimension A is preferably in the order of one-fifth the total axial width of ring assembly 10.

The maximum limit of dimension A should be about one-third of B (total axial dimension of the ring assembly), which in turn is within a few thousandths of an inch of the axial width of the groove. The maximum limit of dimension A of rings 26 and 28 is determined in part by the need to preserve a minimum axial dimension in expander-spacer 30 which will insure sufficient material therein to develop the requisite spring forces for radially and axially expanding the rings. That is, for a given oil groove axial width, rings 26 and 28 cannot be made overwidth to the point where the proper functioning of expander-spacer 30 is impaired. For example, in constucting another embodiment of an oil ring assembly in accordance with the resent invention specifically adapted to fit a .1875 inch nominal oil groove, rings 26 and 28 were given a dimension A of about .048 inch, which when using cast iron material represents almost the minimum as well as maximum limit for this size groove. The expander-spacer was modified so that it was made as one solid band of fairly uniform axial dimension throughout its circumferential length, the only perforations being oil holes formed centrally one in each inner crown 32, and the axial dimension of this modified expander-spacer between rings 26 and 28 was about .085 inch. Dimension A in this example thus constituted about 25% of dimension B, but any further increase in dimension A was limited by the fact that the .085 inch axial dimension of the expander-spacer represents just about the minimum feasible dimension consistent with preserving its ability to perform its spring expanding function. However, in larger width oil grooves, correspondingly greater A dimensions may be employed since the expander-spacer dimension need not be proportionately increased to obtain the requisite expansion forces.

Rings 26 and 28 preferably have an outside diameter ranging between three to six inches for the groove sizes under consideration, and for an A dimension of .048 inch, outside diameters ranging from about 3.125 to 5.125 inches have proven successful.

From the foregoing description, it will now be apparent that an oil ring assembly constructed in accordance with the present invention provides a simple and economical solution to the problem of carbon clogging and lock-up without thereby increasing the cost of manufacturing or assembling the oil ring assembly, nor without altering the basic three-piece balanced oil ring arrangement which has become almost the universal standard in the art for automotive piston oil rings. In addition, oil rings constructed in accordance with the invention have been found to provide the added benefits of more wear and longer life, characteristics which in turn enhance the basic oil control function of the ring assembly. Another unexpected and beneficial result has been a marked reduction in the operational noise level provided by ring assembly 10 of the present invention as compared to the characteristic and somewhat annoying "squeaky" or "chirping" noise produced by axially thin rail oil ring assemblies of the prior art.

We claim:

1. A piston oil ring assembly for use between axially spaced radial side walls of an oil ring groove of a piston adapted to reciprocate in a cylinder of an internal combustion engine, said piston oil ring assembly comprising a pair of cylinder-engaging oil rings and an annular expander-spacer engageable with the inner peripheries of said rings for biasing said rings radially outwardly against the wall of the cylinder and disposed axially between said rings for slidably supporting said rings in axially spaced relation adjacent and in side sealing contact with the associated side walls of the oil groove, said rings each having generally parallel radially extending oppositely disposed side surfaces, said expander-spacer comprising an annular split one-piece, non-bottoming, circumferentially abutment-type expander-spacer in the form of a radially corrugated ribbon of flat spring metal having an alternating series of generally circumferentially extending inner and outer crowns and generally radially extending connecting portions joining the outer and inner crowns together and having side edges respectively disposed closely adjacent the radial side surface of said rings respectively adjacent thereto, said outer crowns each having oppositely extending spacing seats disposed in sliding contact with the side surface of said rings respectively adjacent thereto, said inner crowns each having oppositely projecting lips for imparting radial and axial force components from said expander-spacer to said rings, said ring assembly having a total axial dimension in the operative assembled condition thereof in the range of about three-sixteenths of an inch to about five-sixteenths of an inch, the minimum and maximum axial dimensions between said side surfaces of each said ring being respectively about .040 inch and about one-third of said total axial dimension of said ring assembly in the operative assembled condition thereof.

2. The oil ring assembly as set forth in claim 1 wherein said rings are made of cast iron.

3. The oil ring assembly as set forth in claim 1 wherein said total axial dimension of said oil ring assembly is about ¼ inch and said axial dimension of each of said rings is about .054 inch.

4. The oil ring assembly as set forth in claim 3 wherein the outside diameter of each of said rings is in the order of four inches and the radial dimension between the outer and inner peripheries of each of said rings in about .155 inch.

5. The oil ring assembly as set forth in claim 1 wherein each of said rings have beveled edges at the outer periphery thereof to provide a tapered nose of decreasing thickness radially outwardly of the ring assembly, said nose having an axially extending flat cylinder wall contacting surface having an axial dimension of about one-third of said axial dimension of each of said rings.

6. The oil ring assembly as set forth in claim 1 wherein the total axial dimension of said oil ring assembly is in the order of .1875 inch and said axial dimension of each of said rings is in the order of .048 inch.

7. The oil ring assembly as set forth in claim 1 wherein each of said oil rings comprises a circular parted imperforate segment having a generally axially extending inner periphery and a tapered nose section along the outer periphery, the axial dimension between said side surfaces of each of said rings being in the order of from .048 to .054 inch, the outside diameter of each of said rings ranging from approximately three to six inches and the maximum radial dimension between said inner and outer peripheries of each of said rings being about .180 inch.

8. The oil ring assembly as set forth in claim 7 wherein the outside diameter of each of said rings is about 4.050 inches and said rdaial dimension is between about .155 inch and .180 inch.

9. The oil ring assembly as set forth in claim 1 wherein said total axial dimension is about three-sixteenths of an inch and each of said rings has an axial dimension between said side surfaces on the order of .048 inch, the outside diameter of each of said rings ranging from about 3.125 to about 5.125 inches and the maximum radial dimension of each of said rings between the inner and outer peripheries thereof being about .180 inch.

References Cited

UNITED STATES PATENTS

| | | | |
|---|---|---|---|
| 2,025,299 | 12/1935 | Mitchell | 277—139 |
| 2,614,899 | 10/1952 | Phillips. | |
| 2,789,872 | 4/1957 | Olson | 277—139 |
| 2,907,615 | 10/1959 | Duesenberg | 277—139 |
| 3,105,695 | 10/1963 | Burns et al. | 277—139 X |
| 3,166,331 | 1/1965 | Warrick | 277—139 |
| 3,346,264 | 10/1967 | Hamm | 277—234 X |

SAMUEL ROTHBERG, *Primary Examiner.*

JEFFREY S. MEDNICK, *Assistant Examiner.*

U.S. Cl. X.R.

277—160, 235